United States Patent Office 3,483,640
Patented Dec. 16, 1969

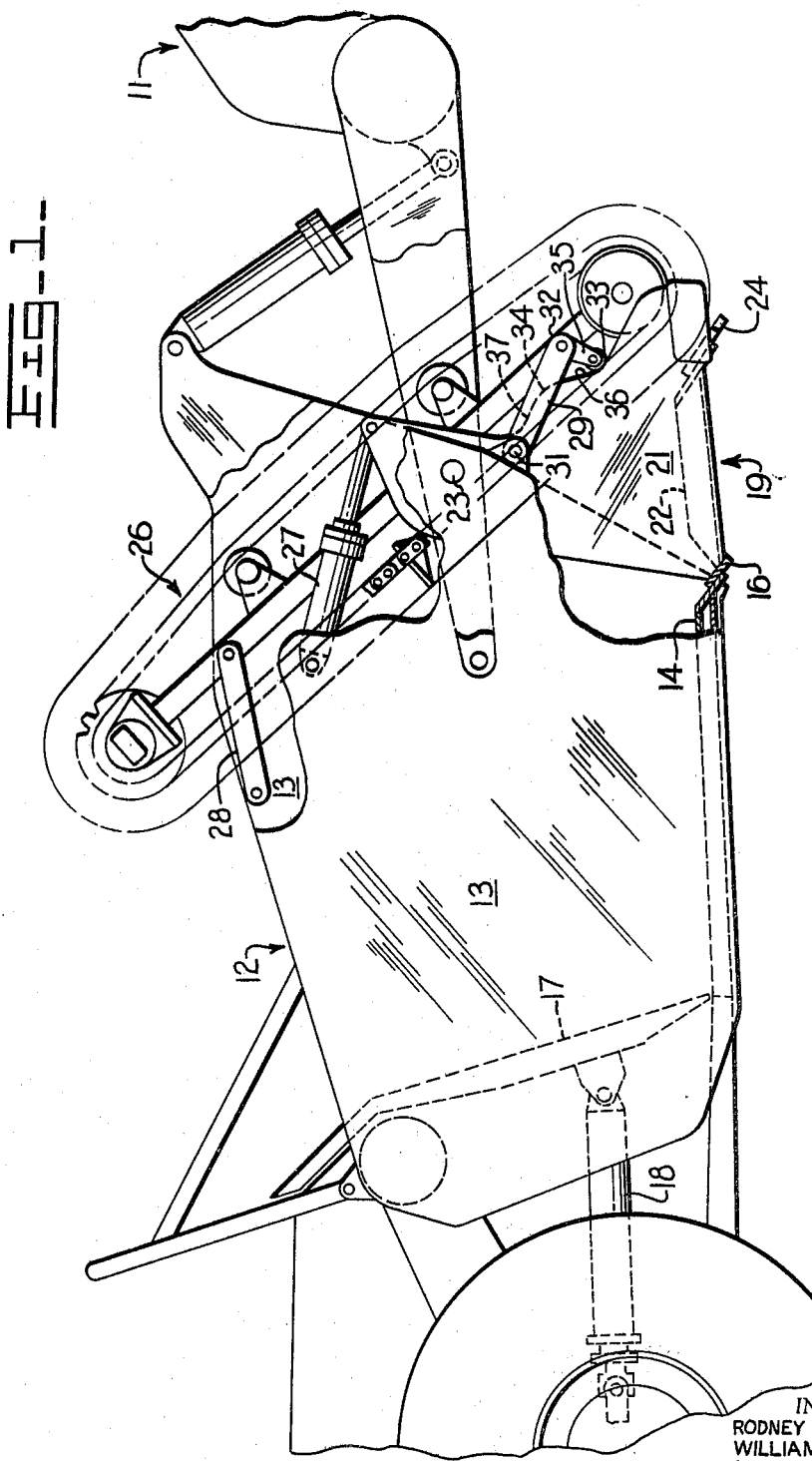

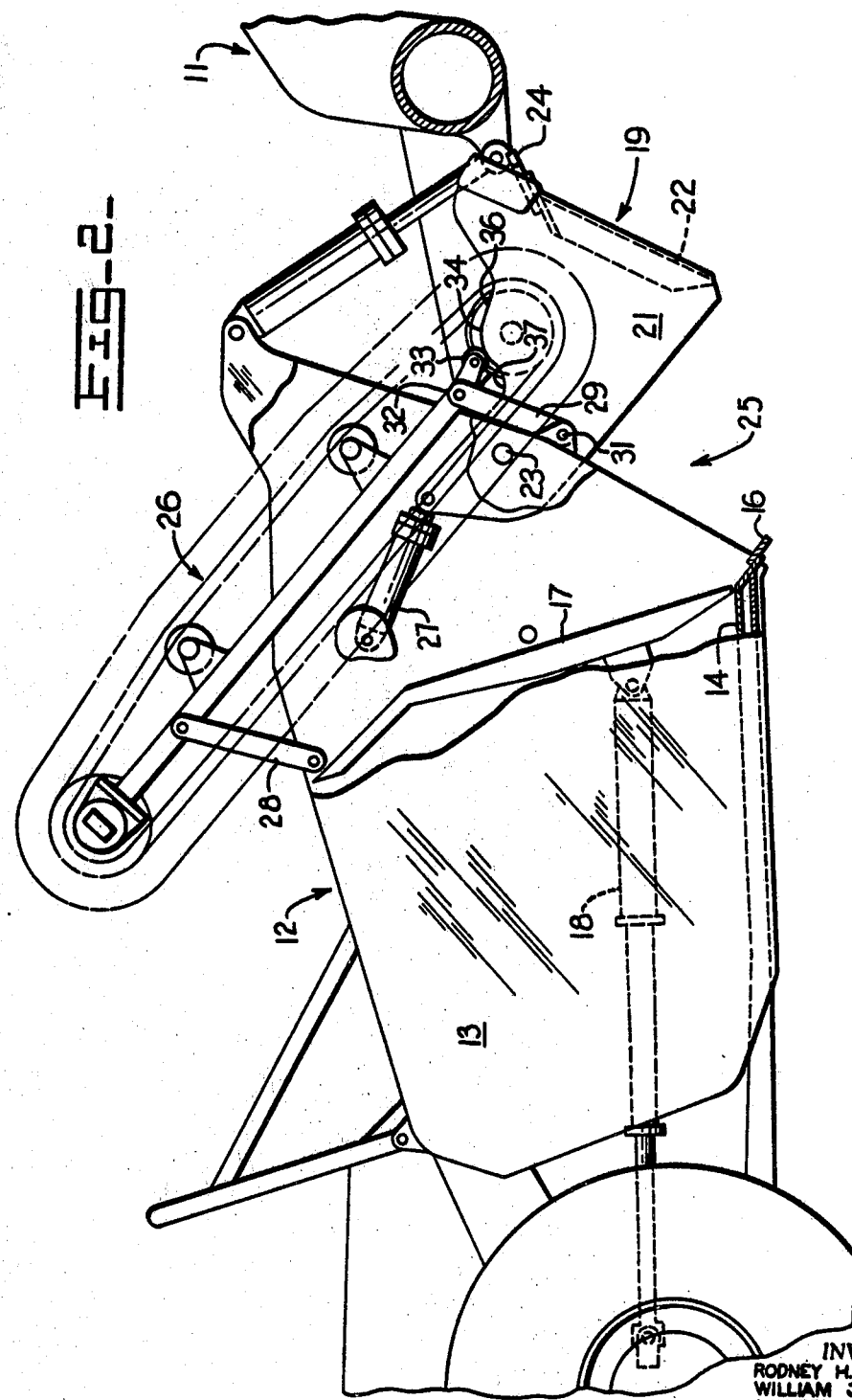

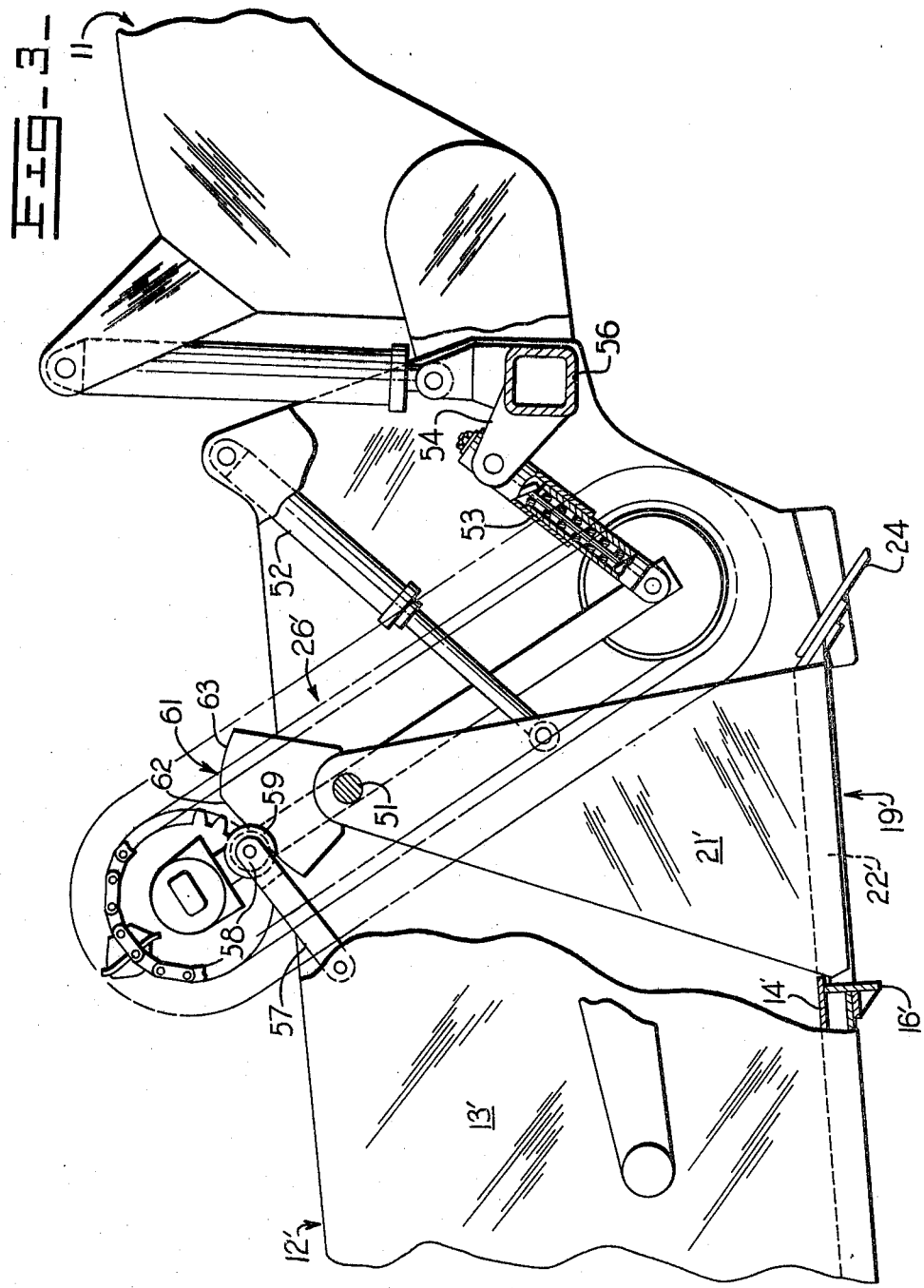

3,483,640
APPARATUS FOR IMPROVING THE STABILITY OF AN ELEVATOR SCRAPER DURING UNLOADING
Rodney H. Anderson, Peoria, William J. Black, Wilmington, and Lawrence J. Miller, Joliet, Ill., assignors to Caterpillar Tractor Co., Peoria, Ill., a corporation of California
Filed May 19, 1967, Ser. No. 639,753
Int. Cl. B60p 1/36; E02f 7/04
U.S. Cl. 37—8
1 Claim

ABSTRACT OF THE DISCLOSURE

A method and apparatus for improving the stability of an earthmoving scraper during unloading. An earthmoving scraper having an auxiliary bowl which pivots forwardly from the main scraper bowl to provide a space forward of the main bowl for unloading of material therefrom and a self-loading elevator pivotally connected to the scraper to normally have a lower end thereof generally forward of the auxiliary bowl at least during loading and resting on the auxiliary bowl by means of rollers. Cam track surfaces defined by the auxiliary bowl support the rollers connected to the elevator, an initial portion of the cam tracks being steeply inclined to raise the elevator just sufficiently to permit forward pivoting of the auxiliary bowl thereunder, a latter portion of the cam tracks maintaining the elevator in a substantially stationary position during subsequent forward pivoting of the auxiliary bowl.

BACKGROUND OF THE INVENTION

A typical elevator scraper has an auxiliary bowl, with a cutting blade thereon, pivotally disposed at a front open end of a main scraper bowl and an elevator disposed with a lower, forward end generally in front of the auxiliary bowl and above the cutting edge to assist in the loading of material into the scraper bowl. In such elevator scrapers, the auxiliary bowl is pivoted forwardly to provide an opening between the main bowl and auxiliary bowl for unloading material from the bowl. The elevator is pivotably connected to the scraper and its lower end is supported on the auxiliary bowl to be pivoted forwardly and upwardly thereby. During unloading of the elevator scraper, the elevator is disposed at a substantial height above the ground level raising the center of gravity of the scraper and decreasing its stability, particularly in large machines having very considerable load-carrying capacities.

SUMMARY OF THE INVENTION

The present invention provides a method and apparatus for improving stability and maintaining a low center of gravity within an elevator scraper particularly when the scraper is unloading. The scraper has a main bowl, an auxiliary bowl pivotally disposed at the forward open end of the scraper main bowl, and an elevator pivotally disposed generally forward of the auxiliary bowl and cutting blade. A guide element is disposed with relation to the elevator for initially raising the elevator only by an amount sufficient to permit forward pivotal motion of the auxiliary bowl necessary to provide an opening between the auxiliary bowl and main bowl through which space material is ejected from the main bowl while permitting the elevator to remain relatively stationary during the latter portion of the forward pivotal motion of the auxiliary bowl.

A method comprising the steps of initially moving the auxiliary bowl forwardly about its pivot connection with the scraper main bowl, at least concurrently raising the elevator to just permit the auxiliary floor to be moved thereunder and subsequently continuing to move the auxiliary bowl forward as necessary to provide a suitable opening between the main bowl and auxiliary bowl for unloading.

BRIEF DESCRIPTION OF THE DRAWINGS

FIG. 1 is a partial side elevation view of an elevator scraper in a carry position with part of the scraper bowl removed to show the auxiliary bowl and elevator assembly.

FIG. 2 is a view similar to FIG. 1, but with the parts shown in unloading position.

FIG. 3 is also a view similar to FIG. 1, but includes an alternate embodiment of apparatus by which the elevator assembly is raised for unloading of the scraper.

DESCRIPTION OF THE PREFERRED EMBODIMENTS

Referring to FIGS. 1 and 2, a typical elevator scraper 11 drawn by a tractor (not shown) comprises a main bowl 12 which has two sidewalls 13, a floor 14 and an open forward end. A striker blade 16 is disposed at the forward end of the bowl floor to distribute material unloaded from the scraper. An ejector 17 forms the rear wall of the scraper bowl and is connected to a hydraulic jack 18 which is extendable to cause the ejector plate to forwardly traverse and unload the scraper bowl. An auxiliary bowl 19 having two sidewalls 21 (one of which is shown) and a floor 22 is connected to the main bowl side walls by pivot connections 23 to form a forward extension of the main scraper bowl. A blade having a cutting edge 24 is disposed along the forward edge of the auxiliary bowl floor over which material is loaded into the scraper. To assist in loading of the scraper, an elevator assembly 26 is inclined forwardly and downwardly generally in front of the auxiliary bowl and above the cutting edge. The elevator scraper is in the position of FIG. 1 during loading of the scraper.

For unloading, the auxiliary bowl is pivoted forwardly and upwardly to provide an opening indicated at 25 in FIG. 2 between the main scraper bowl and the auxiliary bowl through which opening material may be unloaded from the bowl by the ejector. The auxiliary bowl is connected to each main bowl sidewall by a hydraulic jack 27 which controls the pivotal motion of the auxiliary bowl retraction to cause forward pivoting of the auxiliary bowl and to open the main scraper bowl for unloading. Extension of the jacks returns the auxiliary bowl to its normal position. The elevator assembly is connected to each main bowl sidewall by an upper and lower pivotal link, 28 and 29 respectively. With the scraper in a carrying position as shown in FIG. 1 or a similar loading configuration where the main bowl, auxiliary bowl and elevator are lowered so that the cutting edge engages the material to be loaded, the lower end of the elevator assembly extends down to a position forward of the auxiliary bowl floor to provide suitable loading assistance. In the prior art, the elevator was permitted to pivotally ride forwardly and upwardly with its lower end remaining in front of the auxiliary bowl. In this configuration, the upper end of the elevator assembly was then raised substantially above the main scraper bowl. Such an unloading configuration substantially raised the center of gravity of the scraper and detracted from its stability.

In the present invention, a guide element acts against the elevator to raise it just sufficiently to permit the floor of the auxiliary bowl to pass under and substantially past the lower end end of the elevator. Accordingly, the relatively heavy elevator is maintained in a lower position during unloading of the scraper to improve the scraper stability by maintaining a lower center of gravity therein. The step of raising the elevator may be accomplished prior to the forward pivotal movement of the auxiliary bowl. However, the elevator raising step is preferably accomplished concurrently with the initial forward pivotal movement of the auxiliary bowl with subsequent forward pivoting of the auxiliary bowl moving its floor under and partially past the lower end of the elevator as illustrated in FIG. 2. The guide element may, for example, be a separate hydraulic jack or pair of jacks connected between the elevator and scraper but preferably, to raise the elevator automatically, it comprises a pair of cam track guide surfaces, one of which is shown at 34 in FIG. 1, included in the auxiliary bowl.

The lower elevator support link 29 is connected to the main bowl sidewall at pivot point 31. A forward end 32 of each lower support link is connected to the elevator assembly and has a roller 33 on an arm 35 affixed to the lower link, the roller riding on the cam track guide 34 defined by each auxiliary bowl sidewall 21. As the auxiliary bowl is pivoted forwardly by the hydraulic jack 27, the roller rides on the cam track surface causing the elevator to move forwardly and upwardly along the cam tracks of the auxiliary bowl.

To maintain a stable grader unloading configuration having a low center of gravity according to the above description, an initial portion 36 of the cam track surface is steeply inclined and causes the elevator to be raised initially by an amount just sufficient to permit the auxiliary bowl floor to be pivoted thereunder. The latter portion 37 of the cam track surface is generally level to permit the roller 33 to remain at substantially the same vertical level. Thus, during travel of the roller 33 along the initial cam track surface 36, the elevator is pivoted sharply upwardly by an amount just sufficient to permit forward pivoting motion of the auxiliary bowl floor thereunder. Upward pivoting motion of the elevator then substantially ceases as the roller 33 travels along the latter cam track surface 37. The floor of the auxiliary bowl is accordingly permitted to move under and past the lower end of the elevator during subsequent forward pivotal motion of the auxiliary bowl. As illustrated in FIG. 2, in the final unloading configuration of the scraper, the auxiliary bowl, or at least a part thereof, is forwardly pivoted past the lower end of the elevator assembly. A suitable opening is thus provided between the auxiliary bowl and main bowl through which opening the main scraper bowl is unloaded by the ejector. The stability of the grader is enhanced since the elevator assembly remains in a lower position during the unloading operation.

Referring to FIG. 3, an alternate embodiment of the elevator scraper includes a similar main bowl assembly 12', auxiliary bowl 19', and elevator assembly 26'. However, different apparatus is shown by which the auxiliary bowl and elevator assembly are raised to permit unloading of the scraper. The auxiliary bowl 19' is connected to each main bowl sidewall 13' by a pivot connection 51 generally adjacent the upper end of the elevator assembly. The auxiliary bowl is rotated forwardly and upwardly for unloading according to retraction of a hydraulic jack 52 connected to the auxiliary bowl and a forward portion of each main bowl sidewall. A pair of compressible support links 53, e.g., a spring-loaded piston and sleeve assembly (one of which is shown) are pivotally connected to the lower end of the elevator assembly and an arm 54 on a spreader bar 56 located in front of the elevator assembly. A pair of upper support links 57 (one of which is shown) are connected to the main bowl sidewalls and have forward ends 58 connected to the upper end of the elevator assembly and each includes a roller 59. The auxiliary bowl has a portion extending above its pivot connection with the main bowl sidewall, the extension defining a cam track guide surface 61 on which a roller 59 rides, the roller being connected to the upper end of the elevator and the forward end of the upper support link. An initial portion 62 of the cam track guide surface defines a relatively steep incline while the latter portion 63 of the cam track guide surface describes an arc about the auxiliary bowl pivot point 51.

As the auxiliary bowl is pivoted forwardly and upwardly initially by the hydraulic jack 52, the cam track guide is pivoted rearwardly about pivot point 51. During the initial forward pivoting motion of the auxiliary bowl, the roller 59 rides on the initial cam track portion 62 and sharply raises the elevator assembly sufficiently to permit initial forward pivoting of the auxiliary bowl floor 22 beneath the elevator as necessary to provide an opening between the auxiliary bowl and main bowl through which opening material is to be ejected from the main bowl. During the subsequent necessary forward pivotal motion of the auxiliary bowl, the roller 59 rides on the subsequent cam surface 63 in a constant vertical position permitting the elevator assembly to remain in substantially the same location. Thus, the alternate embodiment provides the same advantages as described supra with respect to FIGS. 1 and 2. In addition, the compressible lower support link 53 permits the lower elevator end position to be varied, for example to ride over large rocks or chunks of material entering the scraper bowl, thus facilitating loading and preventing possible damage to the elevator assembly.

Although the present invention has been described with particular reference to two embodiments, variations or modifications thereof are possible within the scope of the present invention. For example, both embodiments include an initial cam track guide element by which the elevator assembly rides up or is raised by an amount just sufficient to permit the auxiliary bowl floor to be forwardly pivoted thereunder. As noted above, the elevator could similarly be raised by, for example, retraction of a hydraulic jack connected between the lower elevator end and the scraper. As another example of a guide element by which the auxiliary bowl could be forwardly pivoted under and at least partially past the lower elevator end, the auxiliary bowl pivot connections 51 with the main bowl sidewalls could be modified to provide for an initial downward pivoting motion of the auxiliary bowl sufficient to clear the elevator assembly and subsequent pivotal motion in a forward direction.

What is claimed is:

1. In an earthmoving scraper having a main bowl open at its forward end and a main bowl floor including a pair of sidewalls, the combination comprising an auxiliary bowl pivoted to the bowl at its open forward end, the auxiliary bowl having a floor with a cutting edge and an upwardly extending member parallel to and adjacent each sidewall, each auxiliary bowl member being pivotally connected to the adjacent sidewall, means for moving the auxiliary bowl between a loading position adjacent the main bowl floor and an unloading position pivoted forwardly from the bowl, an elevator assembly supported at the forward open end of the bowl by pivotal links, the elevator having an end inclined forwardly and downwardly generally above the cutting edge with the auxiliary bowl in its loading position, and a cam track defined by each of the members between the auxiliary bowl floor and the pivot connections between the members and the main bowl sidewalls, each cam track having first and second surface portions, the elevator assembly being supported on said cam tracks by rollers, said first surface portions of the cam tracks supporting the elevator during initial forward pivoting of the auxiliary bowl from its loading position, said second surface portions supporting the elevator during subsequent forward pivoting of the auxiliary bowl from its loading position toward its unloading position, said first surface portions being suitably inclined to raise the forward elevator end just sufficiently to permit forward pivoting of the auxiliary bowl floor therebeneath, said second surface portions generally maintaining the elevator in said raised position as the auxiliary bowl pivots forwardly at least partially therepast.

References Cited

UNITED STATES PATENTS

| | | | | |
|---|---|---|---|---|
| 3,210,868 | 3/1963 | Liess | | 37—8 |
| 3,331,149 | 7/1967 | Rapp | | 37—8 |
| 3,381,396 | 5/1968 | Klein | | 37—8 |

ROBERT E. PULFREY, Primary Examiner

EUGENE H. EICKHOLT, Assistant Examiner

U.S. Cl. X.R.

37—129